United States Patent
Wada et al.

(10) Patent No.: US 12,249,819 B2
(45) Date of Patent: Mar. 11, 2025

(54) ELECTRIC JUNCTION BOX

(71) Applicant: YAZAKI CORPORATION, Tokyo (JP)

(72) Inventors: Masahiro Wada, Makinohara (JP); Takaaki Kakimi, Makinohara (JP); Kazuki Shoji, Makinohara (JP); Kengo Aono, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 223 days.

(21) Appl. No.: 18/134,416

(22) Filed: Apr. 13, 2023

(65) Prior Publication Data

US 2023/0369836 A1 Nov. 16, 2023

(30) Foreign Application Priority Data

May 16, 2022 (JP) ................... 2022-080434

(51) Int. Cl.
*H02G 3/08* (2006.01)
*H02G 3/18* (2006.01)

(52) U.S. Cl.
CPC ............... *H02G 3/081* (2013.01); *H02G 3/18* (2013.01)

(58) Field of Classification Search
CPC ............ H02G 3/08; H02G 3/081; H02G 3/16; H01R 13/46; H01R 9/18; H01R 9/2458; H01R 9/00; H05K 7/00; H05K 7/02; H05K 5/0052; H05K 5/062; B60R 16/0239; B60R 16/02; B60R 16/00

USPC ..... 174/50, 520, 59, 559, 560, 561; 220/3.2, 220/3.3, 4.02; 439/76.1, 76.2, 949; 361/600, 601, 611, 641

See application file for complete search history.

(56) References Cited

U.S. PATENT DOCUMENTS

| | | | | |
|---|---|---|---|---|
| 5,777,843 A * | 7/1998 | Younce | ............... | B60R 16/0238 361/641 |
| 6,121,548 A * | 9/2000 | Matsuoka | ........... | B60R 16/0239 174/59 |
| 6,462,270 B1 * | 10/2002 | Depp | ..................... | H02G 3/081 174/59 |
| 6,541,700 B2 * | 4/2003 | Chiriku | .................. | H02G 3/081 439/949 |
| 7,544,887 B2 * | 6/2009 | Iizuka | .................... | H02G 3/081 174/58 |
| 7,893,364 B2 * | 2/2011 | Oda | ........................ | H05K 7/026 439/949 |
| 8,941,009 B2 * | 1/2015 | Makino | ............... | B60R 16/0238 174/59 |
| 8,969,723 B2 * | 3/2015 | Hirasawa | ............... | H02G 3/088 439/76.1 |

(Continued)

FOREIGN PATENT DOCUMENTS

JP 2007-282320 A 10/2007
JP 2010-11544 A 1/2010

*Primary Examiner* — Angel R Estrada
(74) *Attorney, Agent, or Firm* — Sughrue Mion, PLLC

(57) ABSTRACT

An electric junction box is provided. The electric junction box includes a frame configured to accommodate components, and a lower cover assembled to close a lower end opening of the frame. The lower cover includes a first lower cover having a bottom wall, a side wall, and a notch, and a second lower cover having a shape corresponding to the notch and assembled to the first lower cover. The second lower cover includes a side wall, a blow-up preventing wall, and a reinforcing rib.

4 Claims, 7 Drawing Sheets

(56) References Cited

U.S. PATENT DOCUMENTS

| | | | |
|---|---|---|---|
| 8,981,219 B2* | 3/2015 | Makino | H02G 3/088 |
| | | | 439/535 |
| 9,331,462 B2* | 5/2016 | Kaneko | H02G 3/081 |
| 10,326,262 B2* | 6/2019 | Kiyota | B60R 16/0238 |
| 11,600,978 B2* | 3/2023 | Tomita | H02G 3/14 |

* cited by examiner

ELECTRIC JUNCTION BOX

CROSS-REFERENCE TO RELATED APPLICATIONS

This application is based on and claims priority under 35 USC 119 from Japanese Patent Application No. 2022-080434 filed on May 16, 2022, the contents of which are incorporated herein by reference.

TECHNICAL FIELD

The present invention relates to an electric junction box.

BACKGROUND ART

In the related art, there has been an electric junction box that is mounted on a vehicle and has an accommodation space accommodating electronic components such as relays and fuses, such as a relay box or a fuse box (hereinafter, also referred to as an "electric junction box of the related art"). One of the electric junction boxes of the related art includes a frame for arranging electronic components inside, and a lower cover assembled to close a lower end opening of the frame. The electric junction box is formed with an electric wire lead-out hole that allows an electric wire to be led out from the inside to the outside of the electric junction box (see, for example, Patent Literature 1 to 2).

CITATION LIST

Patent Literature

Patent Literature 1: JP2007-282320A
Patent Literature 2: JP2010-11544A

SUMMARY OF INVENTION

The members constituting the electric junction box (such as the frame and the lower cover) are each manufactured by injecting resin or the like into a dedicated mold. Therefore, when the electric wire lead-out hole is constituted by the frame and the lower cover, the position where the electric wire lead-out hole can be formed and the orientation in which the electric wire can be led out (that is, the orientation of the electric wire lead-out hole) are limited by the situation of the mold.

On the other hand, the lower cover may have a two-member configuration to form the electric wire lead-out hole at a desired position (for example, the bottom wall of the lower cover) and/or to lead out the electric wire in a desired orientation. In this case, the electric wire lead-out hole is formed by the two members constituting the lower cover. However, in this case, since the number of components is increased as compared with the electric junction box in the related art, the number of positions to be assembled between the members is also increased. This similarly increases the path through which liquid such as water enters the inside of the electric junction box, and thus the electric junction box is required to have excellent waterproof properties.

The present invention has been made in view of the above circumstances, and an object of the present invention is to exert excellent waterproof properties to an electric junction box whose lower cover is constituted by two members.

Solution to Problem

In order to achieve the object described above, an electrical junction box according to the presently disclosed subject matter is characterized as follows.

The electrical junction box according to the present disclosure includes a frame configured to accommodate an electronic component; and a lower cover assembled to close a lower end opening of the frame. The lower cover includes a first lower cover including a bottom wall, a side wall standing from a peripheral edge of the bottom wall, and a notch formed by cutting out at least a part of the side wall, and a second lower cover having a shape corresponding to the notch and configured to be assembled to the first lower cover. The second lower cover includes a side wall constituting a side wall of the lower cover together with the side wall of the first lower cover, a blow-up preventing wall protruding from an inner face of the side wall of the second lower cover toward the inside of the electric junction box and having a wall surface facing the bottom wall, and a reinforcing rib provided on the blow-up preventing wall.

An electric junction box according to the present invention will be described below. According to the electric junction box having the configuration, even if water that has entered from the location where the first lower cover and the second lower cover are assembled blows up onto the electronic component accommodated in the frame, the water collides with the blow-up preventing wall provided on the side wall of the second lower cover, and the electronic component is prevented from being exposed to water. Further, according to the electric junction box having the present configuration, since the reinforcing rib is provided on the blow-up preventing wall, the rigidity of the second lower cover and also the rigidity of the electric junction box are excellent.

The present disclosure has been briefly described above. Further, details of the present disclosure will be further clarified by reading through a mode for carrying out the invention described below (hereinafter referred to as an "embodiment") with reference to the accompanying drawings.

BRIEF DESCRIPTION OF DRAWINGS

Exemplary embodiment(s) of the present invention will be described in detail based on the following figures, wherein.

DESCRIPTION OF EMBODIMENTS

Embodiment

Figure 6:
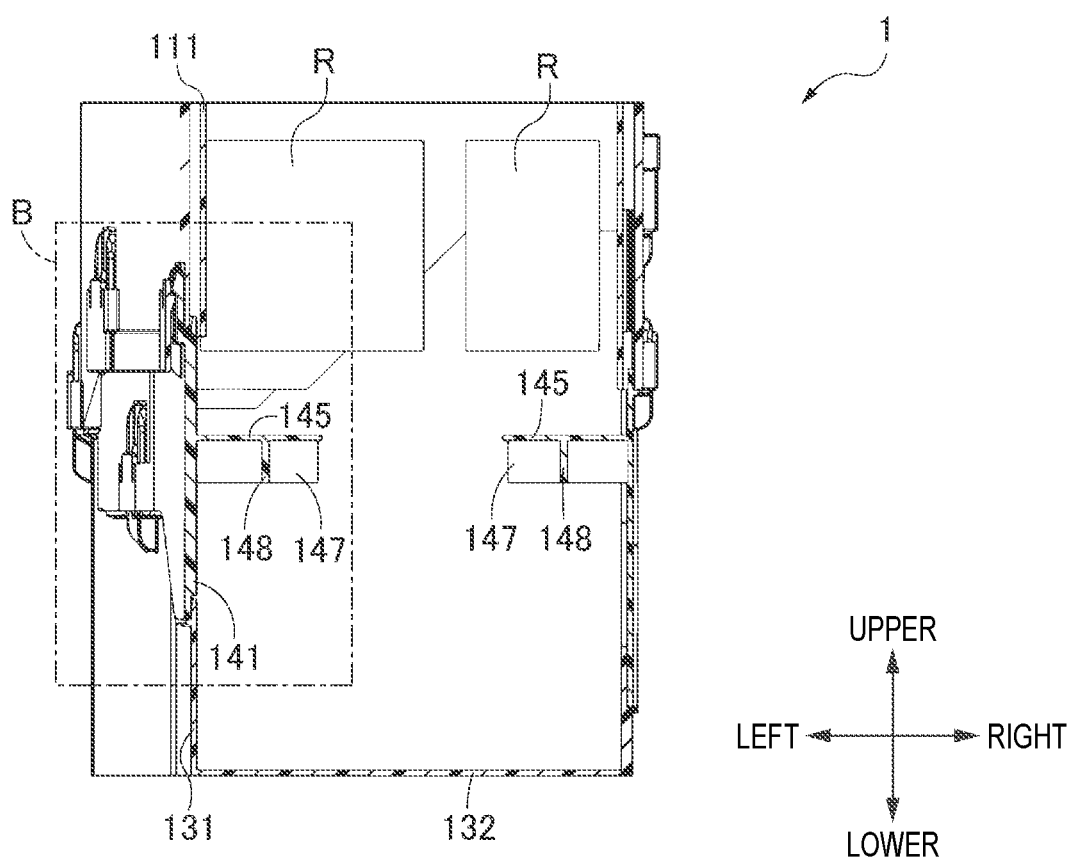
FIG. 6 is a cross-sectional view taken along line A-A of FIG. 1.
Figure 7:
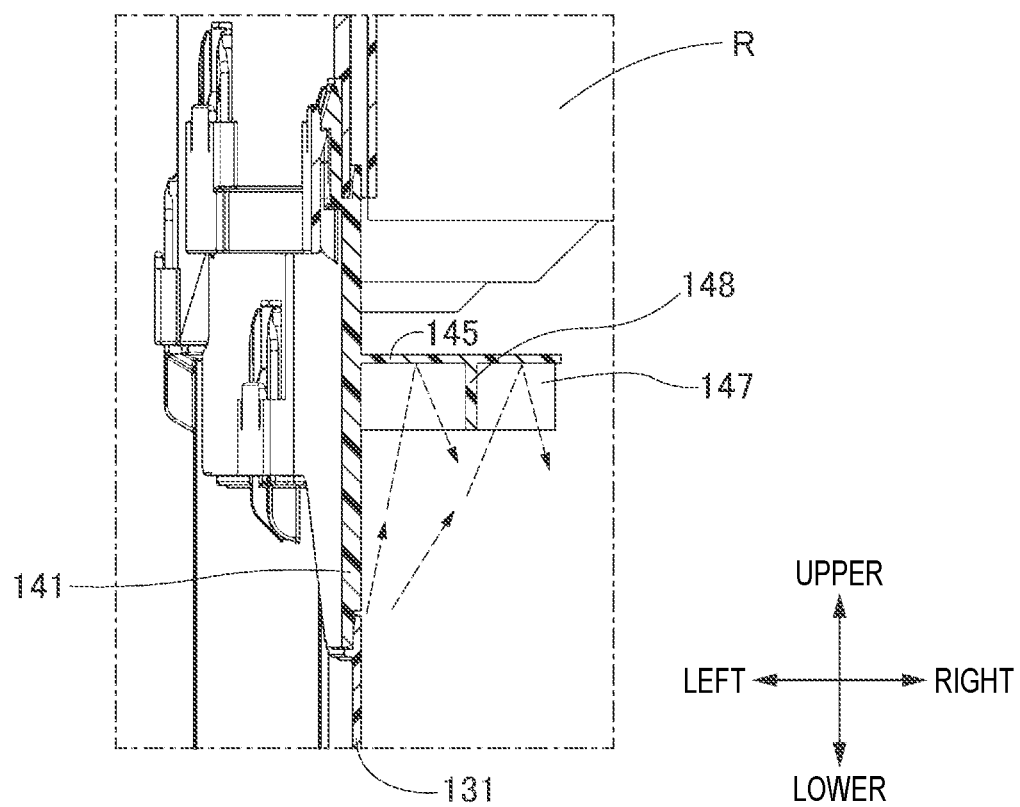
FIG. 7 is an enlarged view of part B of FIG. 6.

Hereinafter, an electric junction box 1 according to an embodiment of the presently disclosed subject matter illustrated in FIGS. 1 to 3 will be described with reference to the drawings. The electric junction box 1 is typically a relay box that is mounted on a vehicle and has an internal space for accommodating components R (see FIGS. 1 and 6), which are electronic components such as relays or other components.

Hereinafter, for convenience of description, "front", "rear", "left", "right", "upper", and "lower" are defined as illustrated in FIGS. 1 to 7. The "front-rear direction", the "left-right direction", and the "upper-lower direction" are orthogonal to each other. When the electric junction box 1 is mounted on a vehicle, the "front-rear direction", the "left-right direction", and the "upper-lower direction" respectively correspond to the front-rear direction, the left-right direction, and the upper-lower direction of the vehicle. A side facing the inside of the electric junction box 1 is referred to as an "inner" side, and a side facing the outside of the electric junction box 1 is referred to as an "outer" side. The left-right direction corresponds to the "protruding direction" of the present invention. Further, the front-rear direction corresponds to the "direction intersecting the protruding direction" of the present invention. The upper-lower direction corresponds to the "vertical direction" of the present invention.

Figure 1:
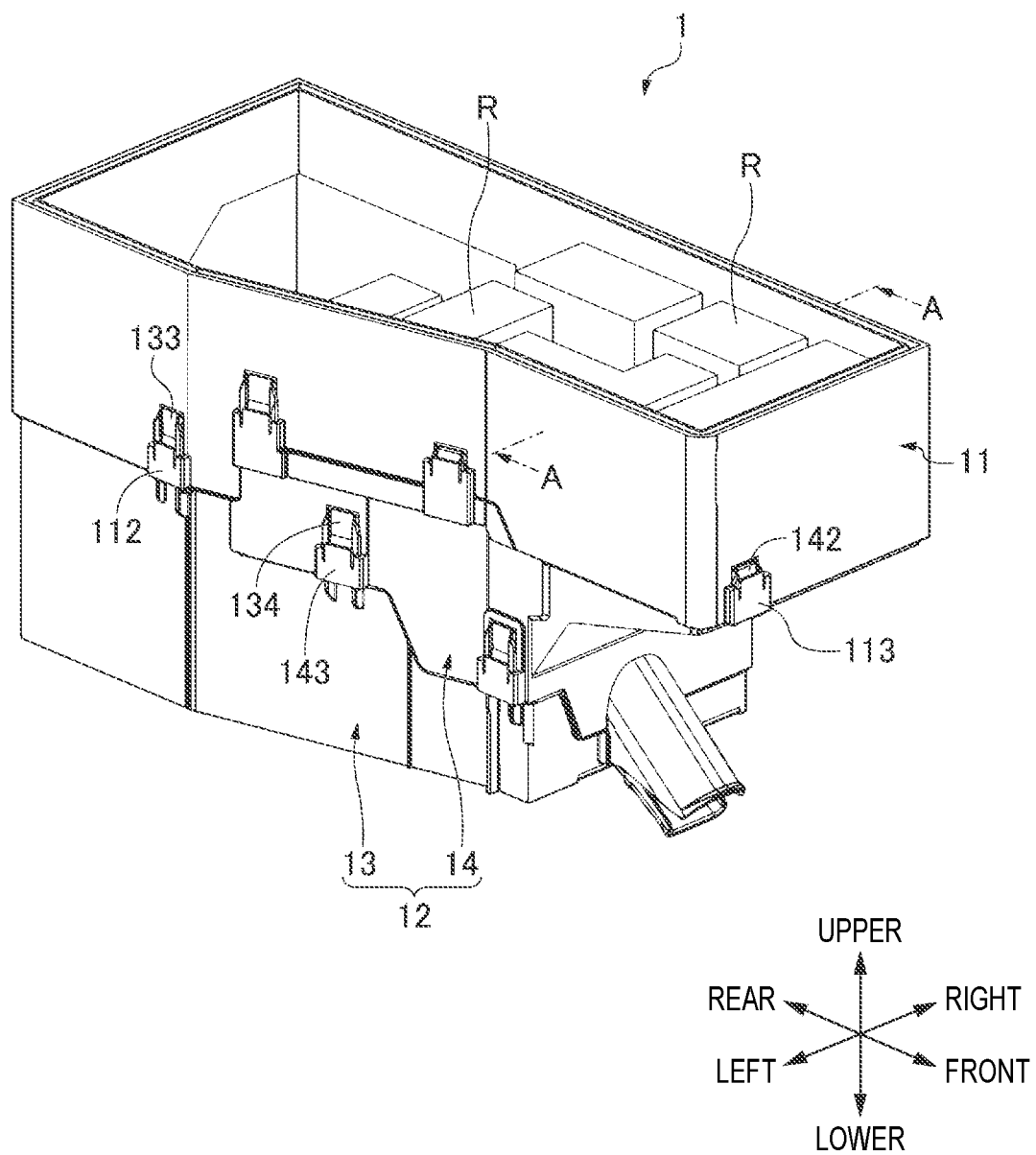
FIG. 1 is a perspective view of an electric junction box according to an embodiment of the present invention.
Figure 2:
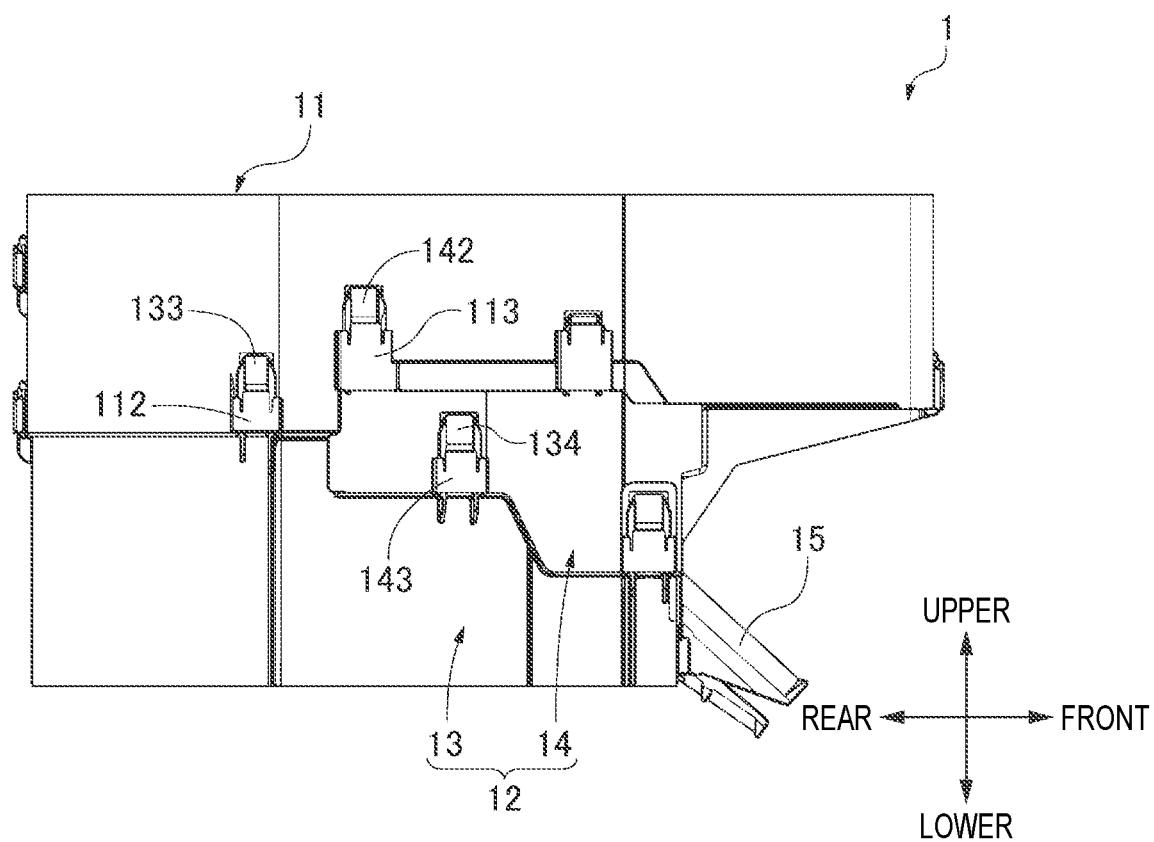
FIG. 2 is a plan view of the electric junction box illustrated in FIG. 1 as viewed from the left side.
Figure 3:
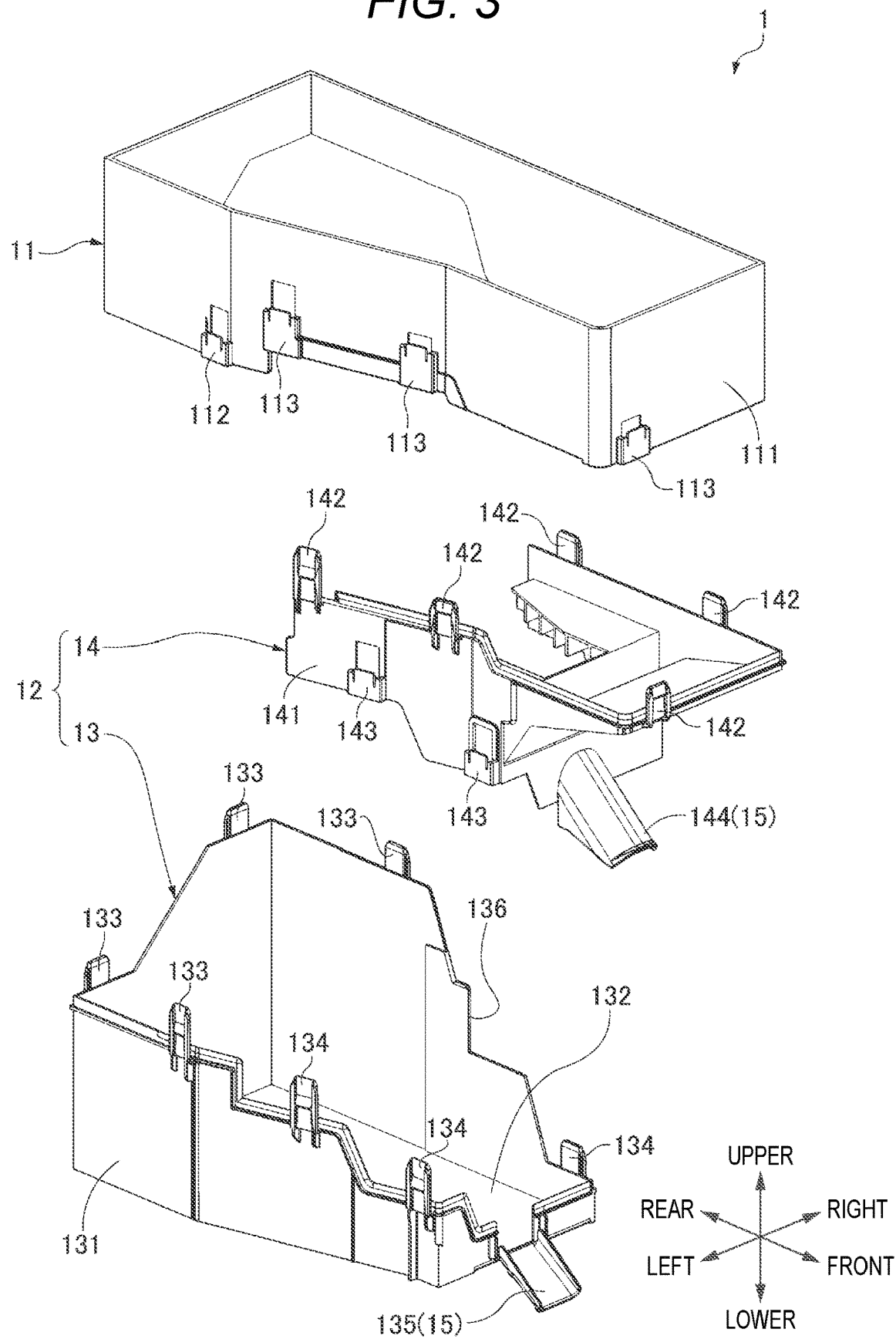
FIG. 3 is an exploded perspective view of the electric junction box as illustrated in FIG. 1 (electronic components are not illustrated)

As illustrated in FIGS. 1 to 3, the electric junction box 1 is constituted by the frame 11 for accommodating the components R, and the lower cover 12 assembled to close the lower end opening of the frame 11. Both of the two components constituting the electric junction box 1 are resin-molded bodies.

In the electric junction box 1, an electric wire (not illustrated) electrically connected to some of the components R located inside the electric junction box 1 is led out to the outside of the electric junction box 1 through the electric wire lead-out hole 15 provided at the front end of the electric junction box 1. The electric wire lead-out hole 15 extends in a manner inclined forward and downward (see FIG. 2). Hereinafter, the frame 11 and the lower cover 12 constituting the electric junction box 1 will be described in order.

First, the frame 11 will be described. As illustrated in FIGS. 1 to 3, the frame 11 includes a substantially rectangular tube-shaped side wall 111 extending in the upper-lower direction. The side wall 111 constitutes the major part of the external appearance of the side face of the electric junction box 1. The outer faces of a plurality of locations (nine locations in this example) in the circumferential direction of the lower end of the side wall 111 are each integrally provided with a locked portion 112, 113 having a through hole extending in the upper-lower direction. The locked portions 112, 113 have a function of assembling the lower cover 12 to the frame 11.

Specifically, the locked portions 112 have a function of assembling a first lower cover 13 of the lower cover 12, which will be described later, to the frame 11. Similarly, the locked portions 113 have a function of assembling a second lower cover 14 of the lower cover 12, which will be described later, to the frame 11.

An upper cover (not illustrated) may be attached to the frame 11 to close an upper end opening of the frame 11. In this case, locked portions (not illustrated) integrally provided on the side wall 111 of the frame 11 are locked to locking portions (not illustrated) of the upper cover, whereby the upper cover is assembled to the frame 11.

Next, the lower cover 12 will be described. As illustrated in FIGS. 1 to 3, the lower cover 12 includes a first lower cover 13 and a second lower cover 14 assembled to the first lower cover 13. The first lower cover 13 and the second lower cover 14 constituting the lower cover 12 will be described in order in the following.

First, the first lower cover 13 will be described. As illustrated in FIG. 3, the first lower cover 13 integrally includes: an annular side wall 131 constituting the major part of the external appearance of the lower side face of electric junction box 1; and a bottom wall 132 closing the annular lower end opening of the side wall 131 and constituting the major part of the external appearance of the bottom face of the electric junction box 1.

The front region in the front-rear direction of the pair of side walls 131 facing each other in the left-right direction and the side wall 131 on the front are notched out in the upper region in the upper-lower direction to form a notch 136. The notch 136 has a substantially rectangular U-shape in the top view.

The outer faces of a plurality of positions (four positions in this example) in the circumferential direction on the upper end of the side wall 131 are each integrally provided a locking piece 133 extending upward in correspondence with the plurality of locked portions 112 of the frame 11.

The outer faces of a plurality of locations (four locations in this example) in the circumferential direction of the upper end of the side wall 131 corresponding to the notch 136 are each integrally provided with a locking piece 134 extending upward in correspondence with a locked portion 143 of the second lower cover 14, which will be described later.

The side wall 131 is provided with a semi-cylindrical gutter-shaped portion 135 that opens upward in a manner inclined forward and downward at a position corresponding to the electric wire lead-out hole 15. The gutter-shaped portion 135 has a function of forming the lower portion of the inner wall defining the electric wire lead-out hole 15.

Figure 4:
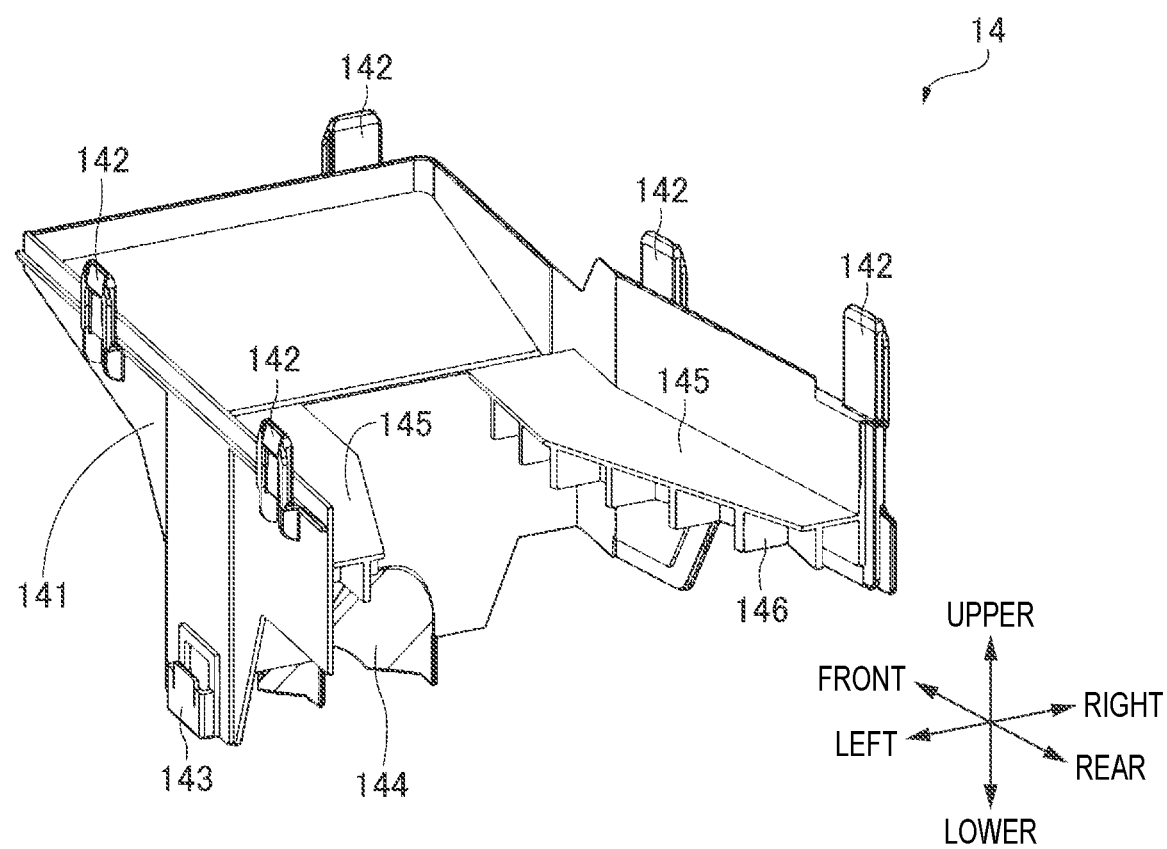
FIG. 4 is a perspective view of the second lower cover as viewed from above.
Figure 5:
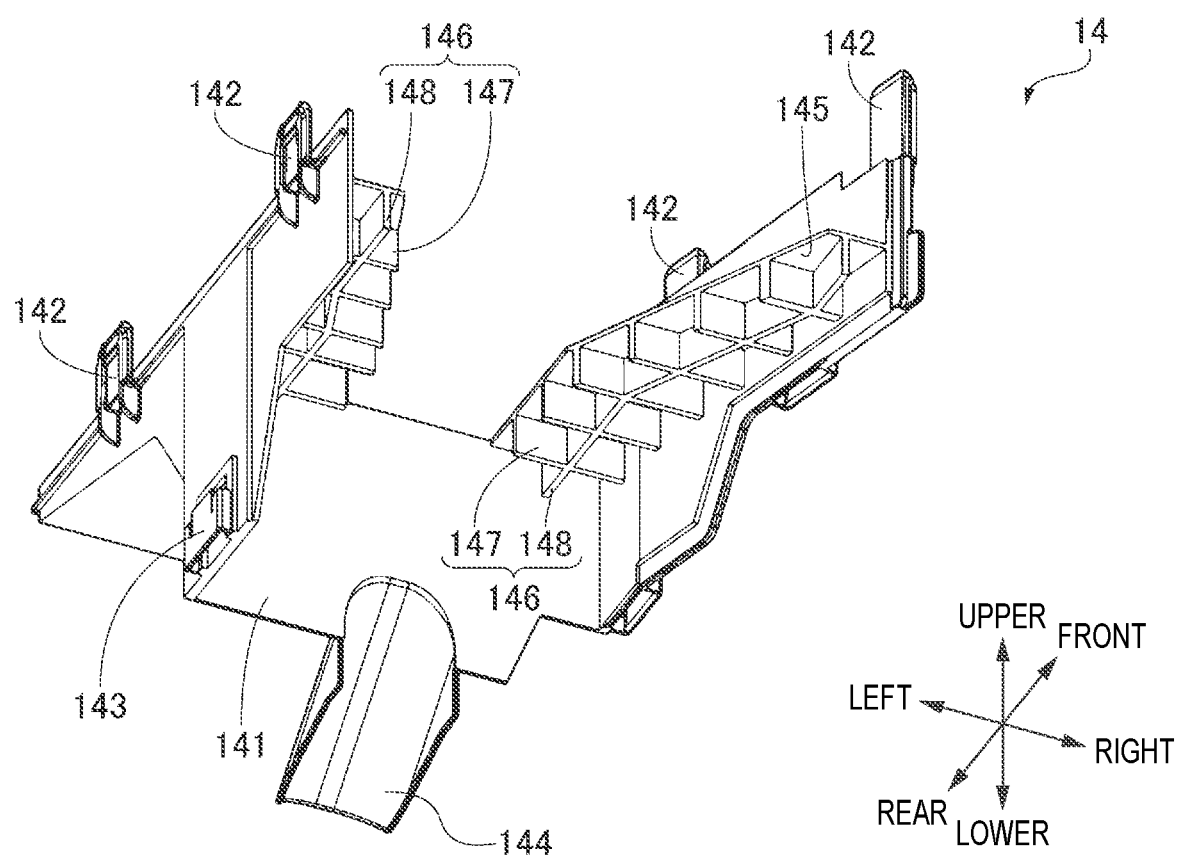
FIG. 5 is a perspective view of the second lower cover as viewed from below.

Next, the second lower cover 14 will be described. As illustrated in FIGS. 3 to 5, the second lower cover 14 includes a side wall 141 having a substantially rectangular U-shape in the top view and constituting a part of the external appearance of the lower side face of the electric junction box 1. In other words, the side wall 141 has a shape corresponding to the notch 136 of the first lower cover 13. That is, the second lower cover 14 is assembled to a portion of the side wall 131 of the first lower cover 13 corresponding to the notch 136, whereby the side wall 131 and the side wall 141 constitute the external appearance of the lower side face of the electric junction box 1 (see FIGS. 1 and 2).

The outer faces of a plurality of positions (five positions in this example) in the circumferential direction on the upper end of the side wall 141 are each integrally provided a locking piece 142 extending upward in correspondence with the plurality of locked portions 113 of the frame 11.

The outer faces of a plurality of locations (four locations in this example) in the circumferential direction of the lower end of the side wall 141 are each integrally provided with a locked portion 143 having a through hole extending in the upper-lower direction. The locking pieces 134 of the first lower cover 13 are locked to the locked portions 143.

The side wall 141 is provided with a semi-cylindrical gutter-shaped portion 144 that opens downward in a manner inclined forward and downward at a position corresponding to the electric wire lead-out hole 15. The gutter-shaped portion 144 has a function of forming the upper portion of the inner wall defining the electric wire lead-out hole 15.

The inner faces of the pair of side walls 141 facing each other in the left-right direction are each provided with a blow-up preventing wall 145 protruding toward the inside (that is, the side walls 141 facing each other in the left-right direction) in a manner extending in the front-rear direction. The lower face of the blow-up preventing wall 145 faces the bottom face of the first lower cover 13 (i.e., the bottom wall 132). The blow-up preventing wall 145 has a function of preventing liquid such as water entering from between the first lower cover 13 and the second lower cover 14 from blowing onto the components R (that is, waterproofing). The blow-up preventing wall 145 also has a function of improving the rigidity of the second lower cover.

The lower face of the blow-up preventing wall 145 is integrally provided with a reinforcing rib 146 protruding downward (see FIGS. 4 and 5). The reinforcing rib 146 includes: a plurality of first ribs 147 extending over the entire region in the left-right direction of the blow-up preventing wall 145; and a second rib 148 extending over the entire region in the front-rear direction of the blow-up preventing wall 145 in a substantially central region in the left-right direction of the blow-up preventing wall 145 (see FIGS. 5 to 7). The reinforcing rib 146 has a function of enhancing the rigidity of the second lower cover 14. The first lower cover 13 and the second lower cover 14 constituting the lower cover 12 have been described above.

The frame 11 and the lower cover 12 constituting the electric junction box 1 have been described above. In order to assemble the electric junction box 1 including the frame 11 and the lower cover 12, it is necessary to assemble the lower cover 12 to the frame 11 after assembling the second lower cover 14 to the first lower cover 13.

In order to assemble the second lower cover 14 to the first lower cover 13, first, the second lower cover 14 is arranged at a location corresponding to the notch 136 of the first lower cover 13. Then, the plurality of locking pieces 134 of the first lower cover 13 are respectively inserted from below into the plurality of through holes of the locked portions 143 of the second lower cover 14, and the plurality of locking pieces 134 are locked to the plurality of locked portions 143. This completes the assembly of the second lower cover 14 to the first lower cover 13.

In the state in which the assembly the lower cover 12 is completed, the second lower cover 14 is prevented from separating upward from the first lower cover 13 due to the locking between the plurality of locking pieces 134 and the plurality of locked portions 143. Further, the gutter-shaped portion 135 of the first lower cover 13 and the gutter-shaped portion 135 of the second lower cover 14 define the electric wire lead-out hole 15 that allows an electric wire (not illustrated) to be led out (see FIGS. 1 and 2) (see FIG. 3).

The side wall 131 of the first lower cover 13 and the side wall 141 of the second lower cover 14 constitute the side wall of the lower cover 12. The annular upper end edge of the side wall of the lower cover 12 has a shape corresponding to the annular lower end edge of the side wall 111 of the frame 11, and can be fitted to the annular lower end edge of the side wall 111.

In order to assemble the lower cover 12 to the frame 11 after the assembly of the lower cover 12 is completed, first, the locking pieces 133, 142 of the lower cover 12 are respectively inserted from below into the corresponding locked portions 112, 113 of the frame 11. From this state, the annular upper end edge of the side wall of the lower cover 12 is fitted to the annular lower end edge of the side wall 111 of the frame 11, and the locking pieces 133, 142 are locked to the corresponding locked portions 112, 113. This completes the assembly of the lower cover 12 to the frame 11 (see FIGS. 1 and 2).

In the state in which the assembly of the electric junction box 1 is completed, the lower cover 12 is prevented from being separated downward from the frame 11 due to the locking between the locking pieces 133 and the locked portions 112 and the locking between the locking pieces 142 and the locked portions 113.

Next, a waterproof structure of the electric junction box 1 will be described. For example, when a vehicle mounted with the electric junction box 1 is cleaned by a high-pressure washing machine, liquid such as water may enter the electric junction box 1 from the positions where the first lower cover 13 and the second lower cover 14 are assembled and blow up toward the components R (see the arrows in FIG. 7). Therefore, the components R may be exposed to water. However, according the electric junction box 1 according to the present embodiment, even if the water that has entered the electric junction box 1 blows up toward the components R, the water collides with the blow-up preventing wall 145, and the components R are prevented from being exposed to water.

Further, since the first ribs 147 and the second rib 148 of the reinforcing rib 146 form a plurality of sections on the lower face of the blow-up preventing wall 145, the water colliding with the blow-up preventing wall 145 is prevented from being scattered around. Thus, the components R are prevented from being exposed to water more effectively. As a result, the electric junction box 1 has excellent waterproof properties.

In addition, due to the blow-up preventing wall 145 and the reinforcing rib 146, in the electric junction box 1 (the second lower cover 14), the pair of side walls 141 in the left-right direction of the second lower cover 14 are prevented from inclining outward or inward. In other words, the electric junction box 1 (second lower cover 14) is excellent in rigidity.

Further, since the electric junction box 1 is constituted by the two members including the first lower cover 13 and the second lower cover 14, the electric wire lead-out hole 15 can be set at a desired position (for example, the bottom wall 132) and a desired angle.

OTHER EMBODIMENTS

It should be noted that the present disclosure is not limited to the above embodiment, and modifications, improvements, and the like can be made as appropriate. In addition, materials, shapes, dimensions, numbers, arrangement positions, and the like of the respective constituent elements in the above embodiment are optionally selected and are not limited as long as the present disclosure can be implemented.

Here, features of the embodiment of the above-described electric junction box according to the present invention will be briefly summarized and listed in <1> to <4> below.
<1>
An electric junction box (1) including:
  a frame (11) configured to accommodate an electronic component (component R); and
  a lower cover (12) assembled to close a lower end opening of the frame, in which
  the lower cover (12) includes
    a first lower cover (13) including a bottom wall (132), a side wall (131) standing from a peripheral edge of the bottom wall, and a notch (136) formed by notching out at least a part of the side wall, and
    a second lower cover (14) having a shape corresponding to the notch and assembled to the first lower cover, and the second lower cover (14) includes
- a side wall (141) constituting a side wall of the lower cover together with the side wall (131) of the first lower cover,
- a blow-up preventing wall (145) protruding from an inner face of the side wall of the second lower cover toward the inside of the electric junction box and having a wall surface facing the bottom wall, and
- a reinforcing rib (146) provided on the blow-up preventing wall.

<2>

The electric junction box (1) according to the above <1>, in which the reinforcing rib (146) includes
- a first rib (147) extending in a protruding direction of the blow-up preventing wall, and
- a second rib (148) extending in a direction intersecting the protruding direction.

<3>

The electric junction box (1) according to the above <1> or <2>, in which the reinforcing rib (146) is provided on the wall surface facing the bottom wall.

<4>

The electric junction box (1) according to any one of the above <1> to <3>, further including:
- an electric wire lead-out hole (15) configured to allow an electric wire to be led out from the inside to the outside of the electric junction box (1), in which
- the electric wire lead-out hole (15) is constituted by the first lower cover (13) and the second lower cover (14).

According to the electric junction box having the configuration of the above <1>, even if water that has entered from the location where the first lower cover and the second lower cover are assembled blows up onto the electronic component accommodated in the frame, the water collides with the blow-up preventing wall provided on the side wall of the second lower cover, and the electronic component is prevented from being exposed to water. Further, according to the electric junction box having the present configuration, since the reinforcing rib is provided on the blow-up preventing wall, the rigidity of the second lower cover and also the rigidity of the electric junction box are excellent.

According to the electric junction box having the configuration of the above <2>, since the first rib and the second rib of the reinforcing rib extend in different directions, the rigidity of the second lower cover is enhanced.

According to the electric junction box having the configuration of the above <3>, since the reinforcing rib is provided on the lower face of the blow-up preventing wall, the water colliding with the blow-up preventing wall is prevented from being scattered around.

According to the electric junction box having the configuration of the above <4>, since the first lower cover and the second lower cover form the electric wire lead-out hole, the electric wire lead-out hole can be set at a desired position (for example, the bottom wall) and a desired angle.

What is claimed is:

1. An electric junction box comprising:
    a frame configured to accommodate an electronic component; and
    a lower cover assembled to close a lower end opening of the frame, wherein the lower cover includes
        a first lower cover including a bottom wall, a side wall standing from a peripheral edge of the bottom wall, and a notch formed by cutting out at least a part of the side wall, and
        a second lower cover having a shape corresponding to the notch and configured to be assembled to the first lower cover, and
    the second lower cover includes
        a side wall constituting a side wall of the lower cover together with the side wall of the first lower cover,
        a blow-up preventing wall protruding from an inner face of the side wall of the second lower cover toward the inside of the electric junction box and having a wall surface facing the bottom wall, and
        a reinforcing rib provided on the blow-up preventing wall.

2. The electric junction box according to claim 1, wherein the reinforcing rib includes
    a first rib extending in a protruding direction of the blow-up preventing wall, and
    a second rib extending in a direction intersecting the protruding direction.

3. The electric junction box according to claim 1, wherein the reinforcing rib is provided on the wall surface facing the bottom wall.

4. The electric junction box according to claim 1, further comprising:
    an electric wire lead-out hole configured to allow an electric wire to be led out from the inside to the outside of the electric junction box, wherein
    the electric wire lead-out hole is constituted by the first lower cover and the second lower cover.

* * * * *